United States Patent [19]
McCann et al.

[11] Patent Number: 5,097,863
[45] Date of Patent: Mar. 24, 1992

[54] FLOW CONTROL APPARATUS

[75] Inventors: Gerald P. McCann, Los Angeles; Donald Verley, Lake Elizabeth, both of Calif.

[73] Assignee: McCann's Engineering and Manufacturing Co., Los Angeles, Calif.

[21] Appl. No.: 710,696

[22] Filed: Jun. 5, 1991

[51] Int. Cl.$^5$ .............................................. G05D 7/01
[52] U.S. Cl. .................................................. 137/504
[58] Field of Search ................................ 137/501, 504

[56] References Cited

U.S. PATENT DOCUMENTS

| | | | |
|---|---|---|---|
| 2,917,075 | 12/1959 | Terry | 137/504 |
| 2,984,261 | 5/1961 | Kates | 137/504 X |
| 3,277,924 | 10/1966 | Nezworski | 137/504 X |
| 3,902,521 | 9/1975 | Keller | 137/375 |
| 4,210,309 | 7/1980 | Grenier | 251/35 |
| 4,513,777 | 4/1985 | Wright | 137/501 |

Primary Examiner—Robert G. Nilson
Attorney, Agent, or Firm—Lyon & Lyon

[57] ABSTRACT

A flow control valve for maintaining a selected and constant flow rate over a range of liquid delivery pressures is disclosed which includes a housing, a cavity defined within the housing, an input channel in fluid communication with the cavity, the input channel adapted to transport liquid into the cavity, an output channel in fluid communication with the cavity, the output channel adapted to transport liquid from the cavity, an adjustment member receivable into the housing, a spring operative with the adjustment member, a sleeve, the sleeve having a plurality of apertures defined therein, the sleeve disposed within the cavity, a piston sized to fit within the sleeve, the piston adapted for reciprocal movement in the sleeve, the piston operative to vary the operational size of the apertures in the sleeve, the spring adapted to impart a force upon the piston to move the piston in a direction away from the sleeve, a membrane positioned between the sleeve and the piston, the membrane attached at one end to the piston, and at the other end to the sleeve, whereby introduction of liquid under pressure through the input channel into the cavity will occasion movement of the piston against the force of the spring, thus affecting the operational size of the apertures in the sleeve, for maintaining the selected liquid flow rate.

6 Claims, 2 Drawing Sheets

FLOW CONTROL APPARATUS

BACKGROUND OF THE INVENTION

1. Field Of The Invention

This invention relates to flow control valves, and in particular, to an improved flow control valve for use in a liquid distribution system, such as a carbonated liquid dispensing system, the flow control valve of the present invention being useful for maintaining a constant liquid flow rate, with minimal variation from the selected flow rate, over a wide range of delivery pressures of the liquid.

2. Description Of The Prior Art

A pressure balanced flow control valve normally incorporates a spring, a piston, a sleeve, and an adjustment stem. In the conventional pressure balanced flow control valve there is a piston, which operates within a sleeve, wherein the piston is spring loaded, so that upon introduction of fluid under pressure into the chamber, the force of the fluid will act upon the piston in a direction opposite the force of the spring, the sleeve being provided with a plurality of passageways or a variable sized channel, such that movement of the piston within the sleeve will vary the size of the passageways through which the fluid is permitted to pass into a fluid outlet. The force of the spring is adjustable through the use of an adjustment member which acts upon the spring to impart greater or less force to the piston to achieve a desired flow rate.

In an alternative system, there is a piston which is connected to an adjustment stem, and moves in a reciprocal manner with respect to a sleeve, which defines a passageway, the piston on the action of a spring connected to the adjustment member, being operative to vary the size of passageway defined by the sleeve such that the flow rate of liquid through the flow control valve is controlled by the amount of spring force applied by the spring and the adjustment member balanced against the pressure of the liquid being introduced into the valve.

In the conventional pressure balanced flow control valve, a very close tolerance must exist between the piston exterior wall and the sleeve interior wall in order to control the flow of low viscus fluids, such as carbonated water. In the absence of this very close tolerance, there is leakage and an associated pressure drop, which affects the rate of liquid flow. Normally, the tolerance between the outside wall of the piston and the inside wall of the sleeve is in the range of from 0.0005 to 0.0010 inches per side. The use of this range of tolerances reduces leakage and pressure drop to a tolerable level, and maintains a desired liquid flow rate over a range of liquid delivery pressures.

However, to maintain the liquid flow rate constant, with minimal variation from the selected flow rate, for an acceptable period of time without undue maintenance or adjustment, the mating surface finish of both the sleeve and the piston must be highly polished. If the tolerance between the mating surfaces of the piston and the sleeve is not closely held, or the mating surfaces are not highly polished, there will be undesirable "blow by" at the higher delivery pressures, resulting in a variation in the liquid flow rate.

Along with the aforementioned problem of close centerline tolerance there must also be a closely held tolerance on the taper of any of the mating surfaces. Any excessive amount of taper that appears between the mating surfaces will also affect the constancy of the liquid flow rate over the normal range of delivery pressures.

The parts for conventional pressure balanced flow control valves are normally made of stainless steel or ceramic in order to obtain a very highly polished surface finish, which aids in the sliding movement of the piston within a sleeve and also reduces the amount of wear. The parts are also generally made of stainless steel or ceramic to prevent any abnormal corrosion or build up of foreign materials, which would affect the movement of the piston within the sleeve.

In the conventional flow control valve, stainless steel is generally of the 304 stainless steel type, which is non-corrosive and has a hard surface and which may be highly polished to a smooth finish. Alternately, a number of known ceramics, which also have an extremely hard surface may be polished to a very smooth finish and thus usable in this application. However, the problem with the use of ceramic is that it is brittle and thus easily breakable during manufacture, normal use or maintenance.

It is essential that the choice of either of these materials be based upon the cost, the desired durability and life of the mating parts, since wear will cause a variation in tolerance, thus affecting the constancy of the flow rate. Although stainless steel parts are generally less expensive than corresponding ceramic parts, the ceramic parts are harder and can function for a longer period of time, due to their resistance to wear. However, it is known that ceramic material is much more difficult to machine or mold and is more easily damaged.

Since the piston moves within the sleeve each time the flow of liquid is started and then stopped, which normally occurs when opening a faucet and then closing it, normal wear will occur due to the movement of the piston exterior wall riding against the interior wall of the sleeve. Generally, in soft drink dispensing applications, the continuous movement of the piston within the sleeve is such that the flow control valve needs readjustment after two or three months of use and replacement within one or two years.

Also, because of the very close tolerances that must exist between the piston and the sleeve, the fluid delivery system must be totally free of any small particles that are foreign to the fluid as these can cause the piston and sleeve to bind. For example, it is quite common for the piston and sleeve to bind as a result of mineral deposits in tap water, if the piston and sleeve in the flow control valve are stored and/or allowed to dry. If this binding occurs, a sizable force is needed to dislodge the piston and the sleeve from one another.

Also, because of these close tolerances, great care must be taken when the piston and sleeve are disassembled for cleaning and then reassembled, so as to avoid any scratch marks when one part is inserted into the other, as the slightest scratch or deformation of either of the mating surfaces of the parts will again cause the two parts to bind and become inoperative or facilitate undesirable "blow-by". If scratches or deformation occurs the parts are generally discarded and must be replaced with new parts. When these parts are made in the factory, they are generally matched in order to provide that the proper tolerances are maintained. Thus, the sleeve and piston are normally sold as a set and the destruction or damaging of any of the parts normally requires the replacement of the entire sleeve and piston assembly.

Various types of flow control valves are presently being used and have been used in the past. For example, U.S. Pat. No. 2,917,075 to C. M. Terry, entitled Flow Control Valve, illustrates a flow control valve which is used for maintaining a predetermined rate of liquid flow with only a slight variation from the desired flow rate. The flow control valve of the '075 patent includes a hollow valve member, slidably mounted in a chamber and having a conical valve seat, which is movable toward and away from an opposing valve seat to control the flow rate through the flow control valve. When the inlet pressure increases to a predetermined level over the spring pressure imparted to the spring mount in the interior of the valve, the inlet pressure causes the hollow valve member to assume a closed position, thereby controlling the outlet rate of flow. In order to increase accuracy of the valve, the valve seating member is shiftably mounted whereby it may be shifted into alignment with the conical valve seat. The compression of the valve spring is set by an adjusting screw to provide the desired pressure differential for maintenance of the desired flow rate.

Another type of flow control is that found in U.S. Pat. No. 3,902,521, to Keller et al, wherein a housing of a self-closing valve has a passage lined with a noise-absorbing synthetic-resin and is formed with a valve seat against which a valve body is engageable. The valve body is provided with a throttle element having substantially the same shape as the valve seat. The lining is bonded inside the housing or formed with longitudinal ribs which space it from the interior of the housing so as to form an air-filled insulating space and to form a drain passage for a pilot valve. A compartment of the valve body is connected to the pressurized inlet side of the passage through a small orifice and depressurized by a power belt so as to allow fluid pressure below the belt to pass through the valve seat and thereby allowing flow through the passage.

Another type of flow control is that found in U.S. Pat. No. 4,210,309 to Grenier, wherein a flush valve having a housing, a movable partition sealingly engaging the housing and defining a primary chamber and a control chamber, where there is an inlet port in the primary chamber, an outlet port in the primary chamber and a valve element connected with the partition for closing the outlet port. There is a flow regulating outlet communicating with the outlet port and the auxiliary chamber for discharging fluid vented through the actuator valve. There is also shown a membrane which is operative to affect sealing of chambers from one another.

The problem with many of the prior devices is the number of parts required to provide an effective pressure balanced flow control valve and the requirement that the parts be of a highly polished surface having very close tolerances. This type of construction requires a great deal of maintenance to the parts and eventual replacement; and also exhibits an undesirable sensitivity to any variance in pressure between the outlet and the inlet, which adversely affects the rate of flow of the liquid to be dispensed.

SUMMARY OF THE PRESENT INVENTION

Objects Of The Present Invention

A primary object of the invention is to provide a new and improved flow control valve which includes the ability to more accurately, and with lower maintenance, maintain a selected flow rate constant over a range of liquid delivery pressures.

It is also the object of the present invention to provide an improved flow control valve which includes a fewer number of parts and thus requires less maintenance.

It is another object of the present invention to provide an improved flow control device which provides for greater ease of adjustment of the pressure differential at which the flow control valve operates.

It is another object of the present invention to o provide an improved flow control valve which substantially reduces undesirable blow-by because of part wear or damage and requires less maintenance.

It is also an object of the present invention to provide an improved flow control valve which has movable parts which are interchangeable and not manufactured together for ease of maintenance.

It is another object of the present invention to provide an improved flow control valve which is constructed to substantially reduce wear upon mating parts to reduce maintenance time and costs.

It is another object of the present invention to provide an improved flow control valve which resists binding of the piston and sleeve together after the fluid transported is permitted to dry.

Summary of Construction and Operation of Present Invention

The pressure balanced flow control valve of the present invention is useful for maintaining a constant flow rate over a range of fluid delivery pressures. The flow control valve includes a housing, a cavity defined within the housing, an input channel in fluid communication With the cavity, the input channel adapted to transport liquid into the cavity, an output channel in fluid communication with the cavity, and the output channel adapted to transport liquid from the cavity, an adjustment member receivable into the housing, a spring operative with the adjustment member, a sleeve, the sleeve having a plurality of apertures defined therein, the sleeve disposed within the cavity, a piston sized to fit within the sleeve, the piston adapted for reciprocal movement in the sleeve, the piston operative to vary the operational size of the apertures in the sleeve, the spring adapted to impart a force upon the piston to move the piston in a direction away from the sleeve, a membrane positioned between the sleeve and the piston, the membrane attached at one end to the piston, and at the other end to the sleeve, whereby introduction of liquid under pressure through the input channel into the cavity will occasion movement of the piston against the force of the spring thus affecting the operational size of the apertures in the sleeve, for maintaining a selected flow rate.

The flow control valve of the present invention also includes a piston retaining ring which maintains the piston within the input channel and prevents the piston, under the action of the spring, from being forced out of the inlet channel and into the liquid delivery line. Furthermore, the flow control valve of the present invention includes a flow control retainer housing which operates with the sleeve to maintain the membrane in an attached engagement with the sleeve. In addition, the external shape of the piston is such that the membrane is maintained in a configuration which provides for centering of the piston within the interior of the sleeve. Thus, a precisely controlled constant flow rate is achieved with little wear on the parts and low maintenance.

DESCRIPTION OF THE DRAWINGS

The flow control valve of the present invention and other objects, features and advantages of the present invention will become more readily apparent from the following description, reference being made to the accompanying drawings, in which.

DESCRIPTION OF THE PREFERRED EMBODIMENT

Figure 1:
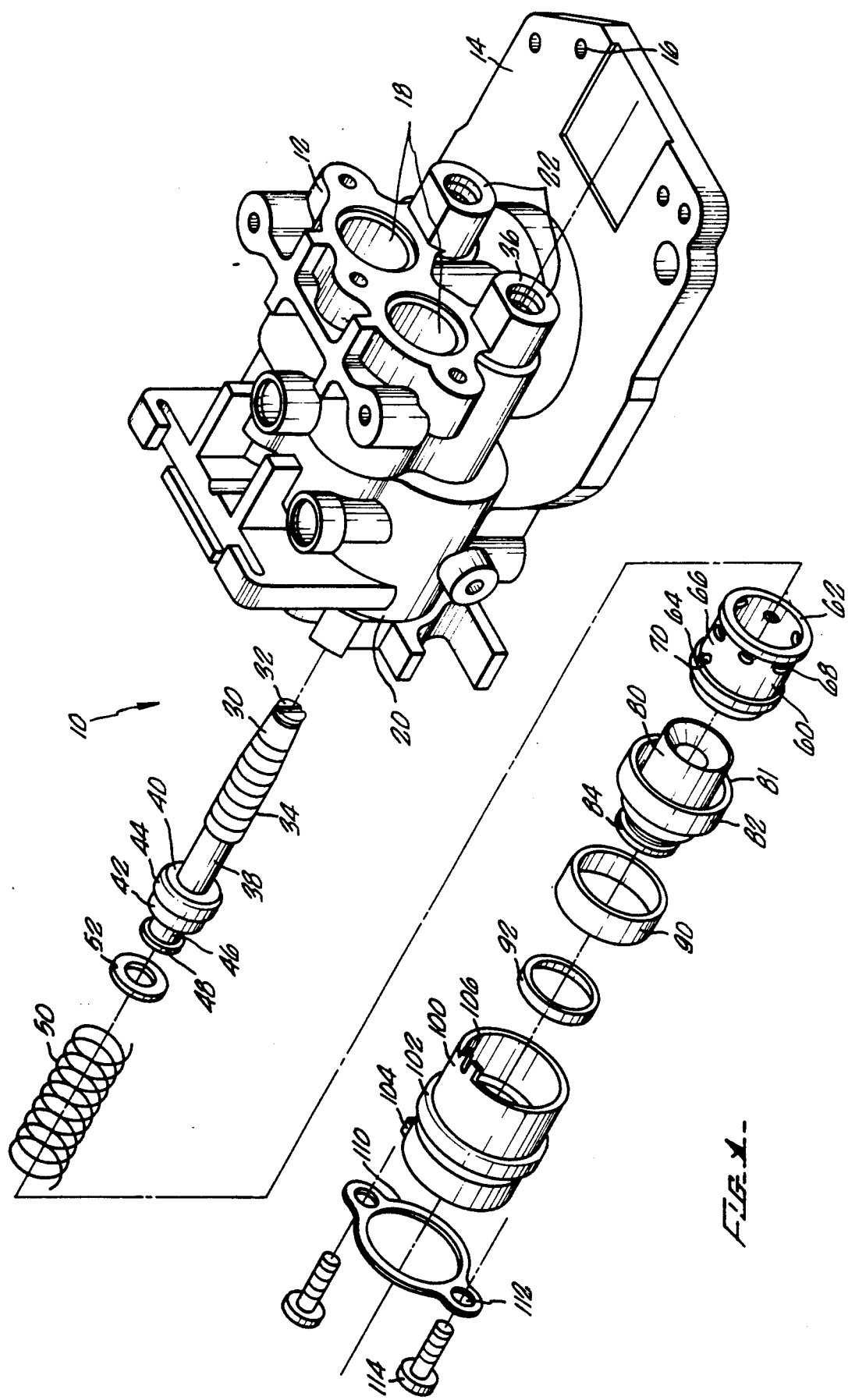
FIG. 1 is a exploded drawing of the flow control valve of the present invention.

A flow control valve constructed in accordance with the present invention is shown in FIG. 1, in an exploded view, and is designated with the numeral 10. The flow control valve 10 includes a housing 12, which consists of a base 14 and includes a series of mounting holes 16, which are operative to support the base 14 upon a receiving platform in a desired location. The housing 12 further includes dual output channels 18 and dual input channels 20, which are better shown in FIG. 2 and will be discussed in greater detail hereinafter. There are also dual adjustment member receiving channels 22 which are co-axial with the input channels 20. The remaining configuration of the housing 12 is defined by the presence of various ribs, mounts, and plates which may take various forms depending upon the required mounting of the flow control valve for operation and for strength and stability requirements.

In exploded view, the flow control valve 10 of the present invention further includes an adjustment stem 30 which is receivable into the receiving channel 22, and has at one end thereof a screw 32 maintained within the stem 30 by either a series of threads (not shown) or by a press fit. The adjustment stem 30 has a plurality of threads 34 which are engageable with opposing threads 36 for maintaining the adjustment stem 30 within the receiving channel 22. The adjustment stem 30 also has a neck portion 38, a first disk portion 40 and a second disk portion 42 with an o-ring 44 disposed there between. The adjustment stem 30 also has a second neck portion 46 with a locking ring 48 at the most distal end thereof, a spring 50 being receivable over the locking ring 48 so as to maintain the spring 50 in a maintained relationship with regard to the adjustment stem 30. There is a washer 52 which is disposed between the spring 50 and the disk 42 whereby rotation of the adjustment stem 30 in either a clockwise or a counter-clockwise rotation will not impart a torque upon the spring 50.

A sleeve 60 is adapted to receive the spring 50, the sleeve 60 having an upper rim 62 and a lower rim 64, between the rims 62, 64 there is a wall 66, which has defined therein a plurality of radially disposed apertures 68. The sleeve 60 also has a pin 70 which is useful for maintaining a defined relationship between the rotational position of the sleeve 60 and the housing 12.

Receivable into the sleeve 60 is a piston 80 which comprises a substantially cylindrical portion 81 and has a flexible membrane 82 maintained in a fixed relationship with regard to the cylindrical portion 80 by the use of a center-apertured cap 84 which is selectively locked to the cylindrical portion 81 to maintain the membrane 82 affixed to the cylindrical portion 81. A ring 90 is disposed around a portion of the membrane 82 and operates to maintain that membrane 82 in a set relationship between the rim 64 of the sleeve 60 and a retainer housing 100 and a head or collar on the membrane. There is also a piston stop ring 92 which is receivable into the retainer housing 100 and acts as a stop to resist movement of the piston 80, upon the urging of the spring 50, out of the input channel 20.

The retainer housing 100 has an o-ring 102 which seals the retainer housing 100 into the input channel 20. The retainer housing 100 also has a lock plug 104 which is receivable into a depression (not shown) in the housing 12 to maintain the retainer housing 100 in a fixed rotational relationship with regard to the housing 12. The retainer housing 100 also has a yoke 106 into which is received the pin 70 to maintain the sleeve 60 in a fixed rotational alignment with respect to the retainer housing 100. Whereby, the sleeve 60 will not rotate with regard to the retainer housing 100 and the apertures 68 are thus maintained in a fixed relationship with regard to their position in relation to a cavity (not shown) within the housing 12 so as to permit constant flow from the apertures 68 into the output channel 18.

There is also a flow control retainer housing set ring 110 which has a plurality of apertures 112 into which are receivable set screws 114 so as to maintain the retainer housing 100 within the input channel 20 upon assembly.

Figure 2:
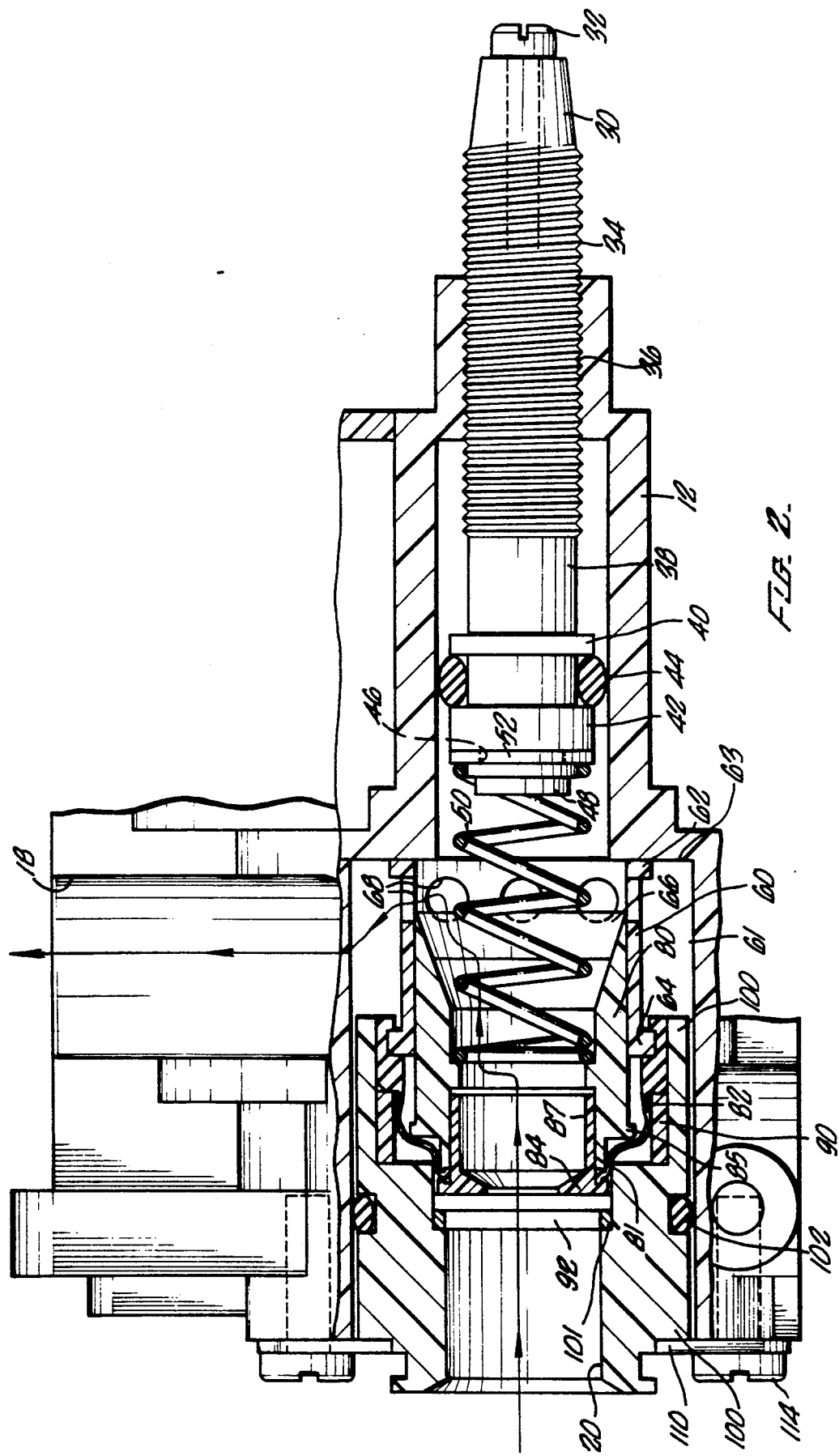
FIG. 2 is a cross-sectional view of the flow control valve of the present invention.

A cross-sectional view of a flow control valve constructed in accordance with the present invention is shown in FIG. 2. The housing 12 has a plurality of threads 36 which oppose the threads 34 contained on the adjustment member 30. By rotation of the screw 32 in a clockwise or counter-clockwise rotation, the adjustment member 30 is either rotated further into the housing 12 or is rotated away from the housing 12. The adjustment member has a first disk 40 and a second disk 42 between which the o-ring 44 is disposed which seals the adjustment member 30 into the housing 12 and prevents the leakage of liquid from the housing 12. There is a neck 46 which has a lock ring 48 which maintains the spring 50 in a proximate relationship with regard to the adjustment member 30. The washer 52 is provided so that rotation of the adjustment member 30 will not create any torque on the spring 50. Since the piston assembly is locked in a fixed position when fastened down, the membrane 82 is locked between the ring 90 and the rim 64.

As can be readily seen from FIG. 2, the sleeve 60 fits into a cavity 61 defined within the housing 12 and abuts a ledge 63 provided within the housing 12. The sleeve 60 has an upper rim 62 and a lower rim 64, the lower rim 64 being receivable into a channel defined within the flexible membrane 82.

Receivable into the sleeve 60 is a piston 80 which has an apertured piston cap 84 which is inserted into the cylindrical portion 81 in a press fit relationship to maintain the flexible membrane 82 attached to the piston 80 at one end. Through the use of the ring 90 and the retainer housing 100 the flexible member is attached at the other end to the sleeve 60. The stop ring 92 is positioned within the retainer housing 90 along a ledge 101 within the retainer housing 100 to prevent passage of the piston 80 or any of the components of the sleeve/piston assembly into the channel 20.

A plurality of apertures 68 are defined within the wall 66 of the sleeve 60 and are selectively varied in operational size by the movement of the piston 80 within the interior of the sleeve 60. The spring 50 operates to provide a biasing force against the piston 80 to move the piston 80 away from the sleeve 60. Only the presence of the stop ring 92 maintains the piston 90 from passing into the inlet channel 20.

The operation of the flow control valve 10 of the present invention will now be described. Upon the introduction of pressurized liquid, such as carbonated water, through the inlet channel 20 the pressurized liquid will pass through the retainer ring 92 and through an aperture present within the piston cap 84 and into a channel 87 present within the piston 80. The liquid will then pass through the interior of the cylindrical portion 81 along a outwardly extending wall defined within the cylindrical portion 81 until it is permitted to flow through the apertures 68 defined within the sleeve wall 66. After the liquid has passed through the apertures 68, it flows into the cavity 61 which is in fluid communication with the output channel 18 and thus the liquid flow is directed to the outside of the flow control valve 10.

Thus, upon the introduction of high pressure liquid into the flow control valve 10 of the present invention the liquid will occasion movement of the piston 80 against the biasing action of the spring 50 to cause the piston 80 to change the operational size of the apertures 68 thereby restricting the flow, which is at higher pressure, thereby maintaining a set flow rate. By rotation of the adjustment stem 30, the spring force applied by the spring 50 upon the piston 80 is increased and therefore greater pressure of the liquid introduced into the flow control valve will have to occur to change the operational size of the apertures 68.

The use of the centering washer 52 with the adjustment stem 30 allows the spring 50 when compressed up against the adjustment stem 30 to move further without binding in the event an adjustment is made of the adjustment stem 30. This is very desirable since it has been found that since the piston cannot turn, any unnecessary rotational torque placed upon the spring 50 may affect the spring rate and thereby its ability to maintain a controlled flow rate. Furthermore, the positions of the apertures 68 With regard to the output channel 18 are maintained in a set relationship to prevent any variance from the desired flow rate.

The spring 50 is utilized to keep the piston 80 from being completely pushed backward by any pressure from the liquid introduced into the inlet channel 20 that the piston 80 will be facing. The spring 50 is also utilized to stabilize the position of the piston 80 that has been adjusted to the desired flow rate. When the spring load on the piston 80 is adjusted to a certain point, to be determined by the operator, the flow rate will be controlled at that point, through the use of the piston edge location in relationship to the apertures 68 in the sleeve 60. The pressure on one side of the piston 80 by the spring 50 is balanced against the flowing pressure of the liquid that is being forced against the cap 84 of the piston 80, thereby resulting in a pressure balanced flow control valve.

As discussed previously, in a conventional pressure balance flow control valve, a very close tolerance must exist between the exterior wall of the piston and the internal wall of the sleeve in order to control the flow of low viscous fluids, such as carbonated water. Normally, these tolerances would be anywhere from 0.0005 to 0.001 inches per side. As discussed previously, the surface finishes of both mating parts must therefore be highly polished and smooth to permit suitable operation.

In the present invention, the problems of requiring a very polished surface and small tolerances between the piston and the sleeve are lessened by increasing the differential diameter between the sleeve 60 and the piston 80. Through the use of the present invention, it is possible to have the tolerance increased to 0.005 to 0.010 per side. Thus, the undesirability of having to maintain the opposing surfaces in a highly polished state, free of scratches and dents or free from residue, is substantially reduced. Maintaining the tolerance is also no longer critical because of the flexible centering membrane 82 which is used between the piston 80 and the sleeve 60.

With the flow control valve 10 of the present invention firmly secured in the faucet body, the spring 50 inside the sleeve 60 and operating against the piston 80 is firmly pressed against the washer 52 that is located on the end of the adjustment stem 30 as well as up against the inside nose area of the piston 80. The spring 50 which abuts the washer 52 allows it to be properly centered on the adjustment stem 30. Since the flexible centering membrane 82 is now in a fixed position as it is clamped in position between the sleeve 60 and the flow control retainer housing 100, it too is now centered and in turn allows the cap 84 of the piston 80 to be equally centered inside the sleeve 60. The piston 80 is centered and operationally suspended in the sleeve 60 and having a minimum differential of 0.005 between the piston 80 and the inside of the sleeve 60, there is virtually little chance of wear on the mating surfaces of sleeve 60 or piston 80.

Since there is a larger differential diameter between the piston 80 and sleeve 60, any burrs, scratches or foreign material have much less effect on their relative movement. This also applies to the finish of the parts as well. Because of the present invention, the two parts can be made of plastic and simply molded. Being able to mold results in a much simpler method and lower cost in material and labor. Also, as improved performance may be obtained, since there is no drag and no "blow by" between the piston 80 and sleeve 60 (as in the case of the stainless steel or ceramic). Also, since there are no foreign particles to cause any binding between the two parts, or corrosion, or scuffs when they were preassembled, the assembly needs very little readjustment once it is calibrated to the range of desired fluid flow rates.

Because the flow control retainer housing 100 is securely fastened into the housing 12 by the metal retaining bracket 110, a force is applied to the valve assembly so that the flexible membrane 80 is now fixed in one position and can not move. Because of this, the small spinning washer 52 on the end of the adjustment stem 30 must be able to turn as the adjustment is either turned clockwise or counter-clockwise. If both the adjustment stem 30, where one end of the spring rests, and the piston 80 are in a fixed position, too much torque would be put on the spring 50. The washer 52 helps correct this condition because it will move or turn as the adjustment stem 30 turns.

The shape of the body of the piston 80 is designed in such a way as to protect the thin flexible membrane 82 from being forced in between the piston 80 and the flow control sleeve 60. On the upper end of the larger diameter of the piston 80 there is a small rim 85 around the upper end a little over-center of the piston 80. This rim 85 extends into the separation or crack between the piston 80 and the housing 100. It also acts as a floor to give support to the membrane 82 and not allow the membrane 82 to become over-stressed and thereby distort the effectiveness of its purpose. When properly molded or machined, the piston 80 that holds the spring 50 is made with a fit that will help maintain the centering effect of the membrane within the flow control housing 100.

The assembly and installation into a faucet of the present invention will now be explained. The piston assembly 80 is actually made of two parts, a cap 84 and a cylindrical portion 81. When assembling, the cap 84 (with the orifice) is inserted into the opening of the flexible centering membrane 82 and the membrane 82 is then pushed up until its small upper extension actually moves inside of a small groove around the rim of the cap 84. The cap 84 and flexible membrane 82 are then pushed into the upper opening of the cylindrical portion 81, and pressed down until a desired length (in this case 0.630 overall length) is obtained. In this position some of the small bead around the opening of the hole in the flexible membrane 82 engages a small groove around the neck of the opening in the larger part of the cylindrical portion 81. When the two parts have been pushed together to the desired length, the piston assembly 80 is securely connected with the bead going up in a small groove in the cap 84 as well going down in a small groove in the neck of the large body of the cylindrical portion 81. In this position and with the desired length, it is now very difficult to pull the membrane 82 away from the piston assembly 80 without possibly tearing the membrane 82.

Next, the piston 80 is inserted into the open end of the sleeve 60 opposite the perimeter apertures 68 and pushed firmly up until a large locking bead on the large edge of the flexible membrane 82 snaps over the lower disk 64 that prevents the piston from going any farther into sleeve 60. With the piston 80, and sleeve 60, and membrane 82 all connected as a unit now, this assembly can be inserted into the flow control retainer housing 100. There is a locating pin 70 on the outside diameter of the sleeve 60 that is sized to permit it to fit into the retainer 100 in one position only. On the retainer 100 is a plug 104 that also will allow it to be placed into the housing 12 in a fixed and single position. This is done to fine tune the accuracy or repeatability of the flow control valve 10. This is especially true when the flow control valve 10 is being used to pour a finished soft drink at the rate of 6 ounces a second. This assures that the apertures 68 of the sleeve 60 are directed in a most favorable position to control the liquid passing through the apertures 68 into the output channel 16 in the housing 12.

Another construction that helps to fine tune the accuracy of the flow control valve 10, again mainly during a very fast pour of the faucet, is the construction of the area just ahead of the piston cap 84. There is the small throat just ahead of the piston cap 84 and before the piston stop ring 92. The stop ring 92 prevents the flexible membrane 82 from being damaged in the event there is ever a reversal in pressure or rapid on and off conditions of the faucet as well as controlling the starting point from where the piston 80 will move during operation. Thus, even though the pour rate is rapid, possibly 6 ounces or more a second, the piston 80 movement can be precisely controlled.

A operational pressure range for a carbonated soft drink at certain flow rates must be held at a minimum of 40 psi to a maximum of 110 psi and yet maintain an accurate flow rate for a fixed period of time of approximately ±2%. To meet this condition, the present invention utilizes the sleeve 60 and piston 80 outlined above, in addition to the flexible membrane 82 with the spring 50, which in this case has just a few coils in order to keep it as rigid as possible yet still have the desired spring load. Proper balancing of the size of the orifice in the cap 84 the piston assembly 80 as well as the proper number of radial apertures 68 around the perimeter of the sleeve wall 66 will cause the flow control valve 10 to function at a slow flow rate over a low pressure range, but also at a fast rate, say 3 to 6 ounces per second, over a greater pressure range. The construction of the piston stop ring 92 assists in making this possible. For example, with a very slight reduction in the diameter of the orifice, an extension of the range and accuracy of the valve.

The present flow control valve 10 is operational to control both fast or slow pour drinks. In a typical fast pour condition, the faucet might be pouring 6 ounces of finished drink, which would be one part syrup and five parts of soda. While in a slow condition, it might be pouring half that rate. The flow control valve 10 can be designed to either condition. A flow control valve also has to be highly sensitive to pressure differentials, for example, when a 9 ounce drink or smaller is to be poured in one or one and one-half seconds. The flow control valve 10 of the present invention meets that requirement.

A reason that a flow control valve 10 of the present invention is desirable in a liquid delivery system is because of the various pressure drops that can be encountered from the liquid dispenser. If soda water is being carbonated at 100 psi of $CO_2$ that would be the pressure that the faucet would be exposed to when it is in a closed position. As the faucet is opened, the use of the flow control valve 10 of the present invention will cause a constant pour to be achieved regardless of whether the pressure goes up or down (within say a range of 40 to 110 psi). The pressure will go up or down depending upon whether the carbonator motor came on while the faucet was in an "on" position. In this condition, with 100 psi set as a constant condition on the soda water in the carbonator tank, as new water is pumped into the tank a hydraulicing effect will occur, which can boost the pressure inside the tank anywhere from 20 to 50 psi higher. The flow control valve 10 of the present invention will compensate for this condition the added pressure is relieved by opening the faucet.

Another condition that can cause a variation in liquid delivery pressure is if two or more faucets are opened at the same time. In this case, there is a substantial pressure drop of from 100 psi to 40 psi through the flow control valve 10, because multiple valves pouring at the same time operates to lower the effective pressure of the carbonated water entering the housing 12. The flow control valve 10 in this situation will adjust to allow sufficient water to pass through the valve 10 to achieve a properly mixed drink. This may also be seen in controlling the flow of the syrups. Syrup may be introduced at a pressure of from 20 to 70 or 100 psi. If the same syrup source feeds one or more faucets, an additional pressure drop will occur, for which the flow control valve 10 must compensate. However, if the syrups are warm the pressure drop is less than if the syrups have been cooled very low. As the syrup thickens a greater amount of pressure drop occurs. Thus the flow control valve 10 must adjust in a range of anywhere from 15 up to 70 psi. If the flow control valve 10 for the syrup and the flow control valve 10 for the soda are both working as designed, a properly blended finished drink is provided.

It should be appreciated that a flow control valve 10 made in accordance with the present invention can be fitted inline (inserted in a single beverage line) as well as mounted in a faucet. The flow control valve 10's primary advantage over other conventional flow controls is its ability in the field to maintain accurate flow rates without any need for readjustment over a period of months. Also by increasing the tolerance between the piston 80 and the sleeve 60, this substantially reduces wear and thus replacement. As pointed out earlier, conventional flow controls are not centrally supported, therefore the piston slides back and forth within a sleeve eventually causes substantial wear. Also, because of the close tolerances that are required when using conventional fluid controls, any foreign particles will cause the mating parts to stick and therefore require servicing and readjustment. If the faucet is left open when being repaired or newly shipped, heavy mineralized water will dry out and act as a glue in binding the sleeve and the piston together due to the surface condition, however this does not occur with this invention due to the material and tolerances. In addition to the benefits pointed out herein, the economic advantage of using plastic molded parts for the flow control valve 10 results in great cost saving.

It should be appreciated that various modifications and changes may be made to the preferred embodiment contained herein without departing from the spirit and scope of the appended claims.

I claim:

1. A flow control valve for maintaining a selected and constant flow rate over a range of liquid delivery pressures, comprising:
   a housing,
   a cavity defined within said housing,
   an input channel in fluid communication with said cavity, said input channel adapted to transport fluid into said cavity,
   an output channel in fluid communication with said cavity, said output channel adapted to transport fluid from said cavity,
   an adjustment member receivable into said housing,
   a spring means operative with said adjustment member,
   a sleeve, said sleeve having a plurality of apertures defined therein, said sleeve disposed within said cavity,
   a piston sized to fit within said sleeve, said piston adapted for reciprocal movement in relation to said sleeve, said piston operative to vary the operational size of said apertures in said sleeve, said spring means adapted to impart a force upon said piston to move said piston in a direction away from said sleeve,
   a membrane positioned between said sleeve and said piston,
   whereby introduction of fluid under pressure through said input channel will occasion movement of said piston against the force of said spring means thus affecting the operational size of said apertures in said sleeve, for maintaining the selected flow rate.

2. The flow control valve of claim 1, wherein said membrane is attached at one end to said piston, and that the other end to said sleeve.

3. The flow control valve of claim 1, which includes a flow control valve retainer housing into which is receivable said sleeve and said piston, the flow control valve retainer housing operative to maintain said sleeve and said piston in a defined relationship in said input channel.

4. A flow control valve for maintaining a selective and constant flow rate over a range of liquid delivery pressures, comprising: a housing, a cavity defined within said housing, an input channel in fluid communication with said cavity, said input channel adapted to transport fluid into said cavity, an output channel in fluid communication with said cavity, said output channel adapted to transport fluid from said cavity, a sleeve, said sleeve defining a passageway, said sleeve disposed within said cavity, a piston, said piston adapted to alter the size of said passageway in said sleeve, in response to liquid delivered under pressure into said housing, biasing means for moving said piston in a direction opposite the direction of liquid flow introduced into said housing, a membrane for centering said piston within said sleeve,
   whereby introduction of fluid under pressure through said input channel will occasion movement of said piston against the force of said spring means, thus bearing the operational size of said passageway in said sleeve, for maintaining the selected flow rate.

5. The flow control valve of claim 4, which includes an adjustment stem operational with said spring means for imparting a biasing force upon said piston.

6. The flow control valve of claim 4, which includes a washer operative with said adjustment stem to reduce the torque upon said spring during adjustment.

* * * * *

UNITED STATES PATENT AND TRADEMARK OFFICE
CERTIFICATE OF CORRECTION

PATENT NO. : 5,097,863
DATED : March 24, 1992
INVENTOR(S) : Gerald MCCANN, et al.

It is certified that error appears in the above-identified patent and that said Letters Patent is hereby corrected as shown below:

In column 4, line 12 delete "o".

In column 4, line 37 change "With", to --with--.

Signed and Sealed this

Twenty-eighth Day of September, 1993

Attest:

BRUCE LEHMAN

*Attesting Officer*    *Commissioner of Patents and Trademarks*